US012242956B2

(12) United States Patent
Nagel et al.

(10) Patent No.: US 12,242,956 B2
(45) Date of Patent: Mar. 4, 2025

(54) SYSTEMS AND METHODS OF CROSS LAYER RESCALING FOR IMPROVED QUANTIZATION PERFORMANCE

(71) Applicant: QUALCOMM Incorporated, San Diego, CA (US)

(72) Inventors: Markus Nagel, Amsterdam (NL); Marinus Willem van Baalen, Amsterdam (NL); Tijmen Pieter Frederik Blankevoort, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 967 days.

(21) Appl. No.: 16/826,524

(22) Filed: Mar. 23, 2020

(65) Prior Publication Data

US 2020/0302299 A1    Sep. 24, 2020

Related U.S. Application Data

(60) Provisional application No. 62/822,254, filed on Mar. 22, 2019.

(51) Int. Cl.
*G06N 3/08* (2023.01)
*G06N 3/04* (2023.01)

(52) U.S. Cl.
CPC .............. *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS

| 9,465,593 | B2 | 10/2016 | Fu | |
|---|---|---|---|---|
| 10,430,514 | B2 | 10/2019 | Guo et al. | |
| 10,789,734 | B2 * | 9/2020 | Pan | G06T 9/002 |
| 11,270,222 | B2 * | 3/2022 | Babbush | G06N 10/00 |
| 11,461,614 | B2 * | 10/2022 | Baum | G06F 30/27 |

(Continued)

OTHER PUBLICATIONS

Junsing Wang, "Design Flow of Accelerating Hybrid Extremely Low Bit-width Neural Network in Embedded FPGA", IEEE, 2018 (Year: 2018).*

*Primary Examiner* — Van C Mang
(74) *Attorney, Agent, or Firm* — Polsinelli LLP (57) ABSTRACT

Various embodiments include methods and neural network computing devices implementing the methods for performing quantization in neural networks. Various embodiments may include equalizing ranges of weight tensors or output channel weights within a first layer of the neural network by scaling each of the output channel weights of the first layer by a corresponding scaling factor, and scaling each of a second adjacent layer's corresponding input channel weights by applying an inverse of the corresponding scaling factor to the input channel weights. The corresponding scaling factor may be determined using a black-box optimizer on a quantization error metric or based on heuristics, equalization of dynamic ranges, equalization of range extrema (minima or maxima), differential learning using straight through estimator (STE) methods and a local or global loss, or using an error metric for the quantization error and a black-box optimizer that minimizes the error metric with respect to the scaling.

20 Claims, 7 Drawing Sheets

(56) References Cited

U.S. PATENT DOCUMENTS

| | | | |
|---|---|---|---|
| 2008/0304600 A1* | 12/2008 | Bottomley | H04B 7/0854 |
| | | | 375/340 |
| 2012/0191446 A1 | 7/2012 | Binsztok et al. | |
| 2020/0097831 A1* | 3/2020 | Wang | G06N 3/084 |
| 2020/0097853 A1* | 3/2020 | Golovin | G06N 5/01 |

* cited by examiner

SYSTEMS AND METHODS OF CROSS LAYER RESCALING FOR IMPROVED QUANTIZATION PERFORMANCE

RELATED APPLICATIONS

This application claims the benefit of priority to U.S. Provisional Application No. 62/822,254 entitled "Systems and Methods of Cross Layer Rescaling for Improved Quantization Performance" filed Mar. 22, 2019, the entire contents of which are incorporated herein by reference for all purposes.

BACKGROUND

Deep neural networks are used heavily on mobile devices for a variety of tasks, including scene detection, facial recognition, image sorting and labeling. Convolution is frequently used for deep neural networks to accomplish these tasks, and is usually implemented using matrix multiplication. Prediction models and deep neural network models are trained using 32-bit floating point (FP32) computations or operations. Yet, many hardware systems, particularly those used in mobile and wireless devices, implement an 8-bit computing/processing architecture and/or are optimized for 8-bit integer (INT8) computations or operations. Converting prediction models and deep neural network models that are trained for 32-bit floating point (FP32) computations or operations to run on a processor implementing an 8-bit computing/processing architecture results in biases and error through rounding errors.

SUMMARY

Various aspects include methods and computing devices implementing such methods for performing quantization in neural networks. Various aspects may include scaling each output channel weight of a first layer of the neural network by a corresponding scaling factor, and scaling each of a second adjacent layer's corresponding input channel weights by applying an inverse of the corresponding scaling factor to the input channel weights. Some aspects may further include determining the corresponding scaling factor so as to equalize ranges of weight tensors or output channel weights within a first layer of the neural network. Some aspects may further include determining the corresponding scaling factor based on at least one of heuristics, equalization of dynamic ranges, equalization of range extrema (minima or maxima), differential learning using straight through estimator (STE) methods and a local or global loss, or using an error metric for the quantization error and a black-box optimizer that minimizes the error metric with respect to the corresponding scaling. Some aspects may further include using a black-box optimizer on a quantization error metric to find the corresponding scaling factor. Some aspects may further include performing batch normalization folding operations on the neural network. Some aspects may further include quantizing weights within the neural network.

Further aspects include methods of generating a trained neural network model for execution on a small-bit width architecture processor. Such aspects may include scaling each output channel weight of a first layer of the neural network by a corresponding scaling factor, scaling each of a second adjacent layer's corresponding input channel weights by applying an inverse of the corresponding scaling factor to the input channel weights, quantizing weights within the trained neural network to generate a quantized neural network suitable for execution on the small-bit width architecture processor, and loading the quantized neural network on the small bit-width architecture processor. Some aspects may further include determining the corresponding scaling factor so as to equalize ranges of weight tensors or output channel weights within a first layer of the neural network. Some aspects may further include determining the corresponding scaling factor based on at least one of heuristics, equalization of dynamic ranges, equalization of range extrema (minima or maxima), differential learning using straight through estimator (STE) methods and a local or global loss, or using an error metric for the quantization error and a black-box optimizer that minimizes the error metric with respect to the corresponding scaling. Some aspects may further include using a black-box optimizer on a quantization error metric to find the corresponding scaling factor. Some aspects may further include performing batch normalization folding operations on the neural network.

Further aspects may include a computing device including a neural network configured to perform operations of any of the methods summarized above. Further aspects may include a computing device including means for performing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Neural networks trained to perform various functions on a target computing device (e.g., a mobile device) are typically generated by a computing device that trains a neural network using a training data set. The computing device used to train the neural network may have a precision or "bit-width" (e.g., capable of 32-bit floating point (FP) operations) great than the precision or bit-width of the target computing device on which the trained neural network will be implemented. To enable execution on target computing devices with a processor architecture having a bit-width smaller than the bit-width architecture of the training computing device, trained neural networks are transformed to lower precision through a process known as quantization so that the weight tensors within the neural network are compatible with the bit-width architecture of the target computing device.

Various embodiments include methods, and computing devices configured to implement the methods, for performing layer-wise scaling in neural networks for improved quantization of large bit-width model neural networks into neural networks suitable for operating on small bit-width processors. The computing device may be configured to shift the scaling associated with a channel or layer in the neural network (referred to herein as the "corresponding scaling factor") to an adjacent layer (e.g., preceding layer, subsequent layer, etc.) and/or apply scaling in this manner to many channels/layers in the network. The operations of the various embodiments improve quantization ranges, and reduce quantization errors and/or noise associated with post-training quantization.

The term "computing device" is used herein to refer to any one or all of servers, personal computers, mobile devices, cellular telephones, smartphones, portable computing devices, personal or mobile multi-media players, personal data assistants (PDA's), laptop computers, tablet computers, smartbooks, Internet-of-Things (IoT) devices, palmtop computers, wireless electronic mail receivers, multimedia Internet enabled cellular telephones, connected vehicles, wireless gaming controllers, and similar electronic devices which include a memory and a programmable processor.

The term "neural network" is used herein to refer to an interconnected group of processing nodes (e.g., neuron models, etc.) that collectively operate as a software application or process that controls a function of a computing device or generates a neural network inference. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input data and activation. The weight values may be determined during a training phase and iteratively updated as data flows through the neural network.

The term "quantization" is used herein to refer to techniques for mapping input values of a first level of precision (i.e., number of bits) to output values in a second, lower level of precision (i.e., smaller number of bits). For example, various embodiments provide methods suitable for converting 32-bit weights and activations determined through training of a 32-bit neural network model on a 32-bit architecture computing device into 8-bit weights and activations for execution on 8-bit architecture processors. The difference between an input value and its quantized value is referred to as a quantization error. For example, quantization operations may change a representation, such as from a 32-bit floating point (e.g., FP32) representation into 8-bit fixed point (e.g., INT8) representation.

As the various embodiments include methods for improving the quantization of neural network models with a large bit-width (e.g., 32-bit) into neural network models suitable for execution on small bit-width architecture processors, the relative words "large" and "larger" are used herein to refer to the original (pre-quantization) neural network and the relative words "small" and "smaller" are used herein to refer to the quantized neural network. Similarly, the term "large bit-width" refers to the bit-width of the original neural network model and the precision or architecture of the computing device that trains the neural network, and the term "small bit-width" refers to the bit-width of the target computing device and the quantized neural network. For example, a "large bit-width" neural network may have 32-bit (or larger) values in the weight tensors, and the "small bit-width" quantized version of the neural network may have 8-bit values in the weight tensors.

Deep neural networks implement a layered architecture in which the activation of a first layer of nodes becomes an input to a second layer of nodes, the activation of a second layer of nodes becomes an input to a third layer of nodes, and so on. As such, computations in a deep neural network may be distributed over a population of processing nodes that make up a computational chain. Deep neural networks may also include activation functions and sub-functions (e.g., a rectified linear unit that cuts off activations below zero, etc.) between the layers. The first layer of nodes of a deep neural network may be referred to as an input layer. The final layer of nodes may be referred to as an output layer. The layers in-between the input and final layer may be referred to as intermediate layers, hidden layers, or black box layers.

Many application development platforms and server computing devices utilize a large bit-width format (e.g., Floating point or FP32) for data, and neural networks are often trained in powerful servers using large bit-width values. On the other hand, resource constrained devices, such as IoT devices, smartphones and other mobile devices, may implement a small bit-width (e.g., INT8) architecture, and an increasing number of hardware manufactures have begun adding support for optimized eight-bit integer operations that better support neural networks and other systems that sequentially perform a large number of relatively simple computations.

Since many neural network models are trained via a server using large bit-width values (e.g., FP32 values) and software implementing such trained models are deployed on resource constrained computing devices with low bit-width (e.g., INT8) architectures, quantization techniques are often used to convert large bit-width model values into small bit-width representations that are suitable for use on computing devices.

Neural network quantization techniques may be used to reduce size, memory access, and computation requirements of neural network inference by using small bit-width values (e.g., INT8 values) in the weights and activations of a neural network model. However, quantization of large bit-width models into small bit-width representations may introduce quantization errors or noise on the weights and activations.

Figure 1A:
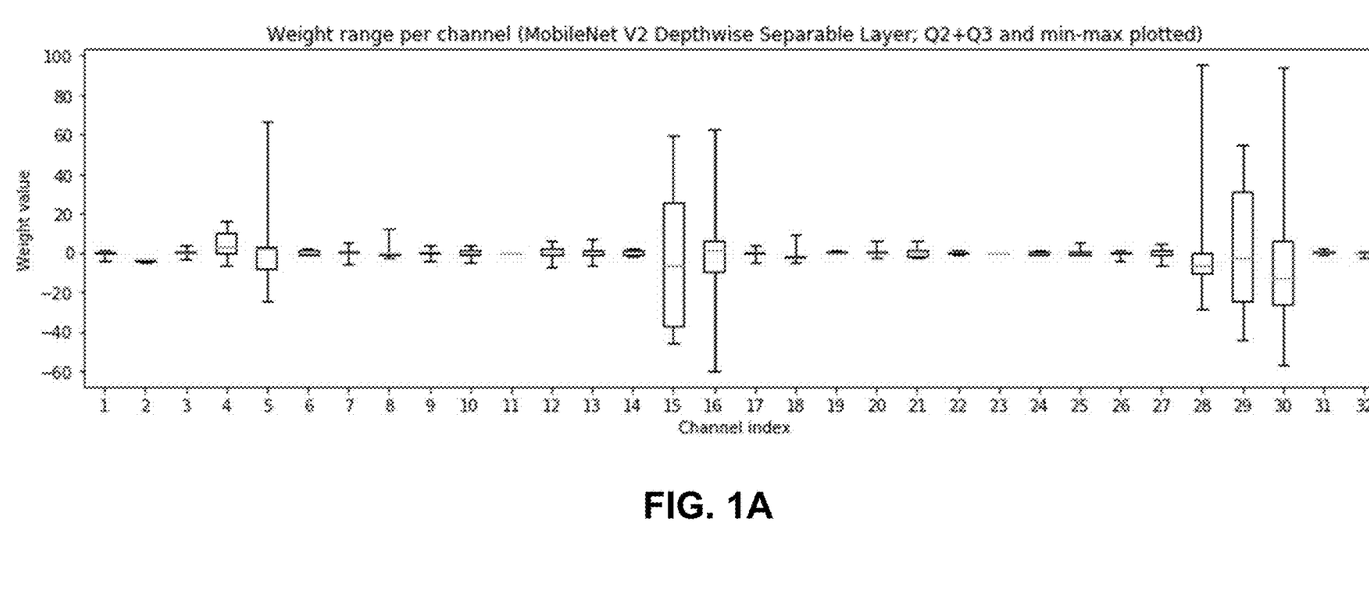
FIG. 1A is a graph showing ranges of weight values per channel in an example neural network.

The source of errors introduced through quantization of large bit-width models into small bit-width representations is particularly problematic for trained neural networks that have layers with widely differing ranges of weight values. As illustrated in FIG. 1A, a neural network trained on a computing device with a large bit-width architecture may have layers with widely varying ranges of weight values (the difference between the highest weight value and the lowest weight value in a layer's weights tensor). For example, the weights in the layer with channel index "6" is shown to have weights ranging from about +1 to 0, or a range of 1, while the weights in the layer with channel index "16" is shown to have weights ranging from about +50 to about −50, or a range of 100, with a majority of values ranging between about +10 and −10. The precision provided by a large bit-width (e.g., 32 bits) can accommodate varying weight range ranges accurately, as well as handle outlier values (e.g., shown by the range in channel 16 far above and below the majority of values). However, computing devices with a small bit-width architecture have fewer bits to represent the weight values, and thus cannot provide the same level of precision for layers with narrow ranges of weights (e.g., channel 6) as for layers with broad ranges of weight, including outliers (e.g., channel 16). For example, converting a 32 bit-width neural network model with layer weight ranges illustrated in FIG. 1A to execute on an 8 bit-width architecture requires using 8 bits to represent weights with ranges spanning two orders of magnitude. Thus, scaling the range of weights in channel 16 to be expressed in 8 bits means that the entire range of the weights in channel 6 must be reflected in 1 or 2 of the least significant bits, reducing in a significant reduction in fidelity for the channel 6 layer (as well as most other layers). Consequently, when weight values for neural network layers determined by training on a large bit-width processor are transformed into a neural network model suitable for execution on a small bit-width architecture computing device, some approximations are necessary. These approximations result in errors and loss of fidelity or accuracy.

Figure 1B:
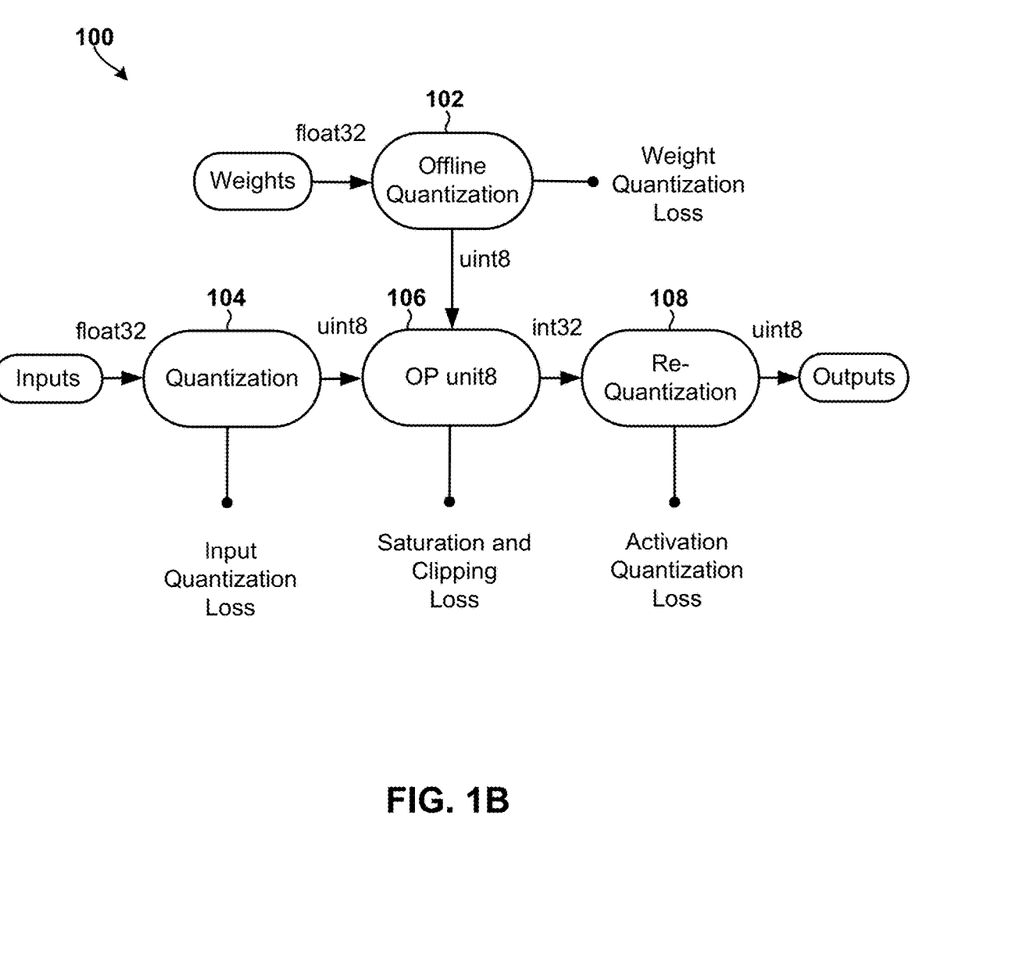
FIG. 1B is a component block diagram illustrating an example software implemented fixed-point quantized pipeline that may benefit from performing cross layer rescaling operations in accordance with the various embodiments.

FIG. 1B illustrates various operations involved in quantizing a neural network model trained using 32-bit floating-point values ("float32") values on a 32 bit-width processor and executing that model on a computing device having an 8 bit-width architecture. Quantization operations include offline quantization 102 of the neural network weights in float32 values to unsigned value (uint8) values to generate a small bit-width neural network model for execution on a small bit-width architecture processor. Then during execution, input quantization 104 may occur on input values, (e.g., converting float32 bit input values) that are provided as input to execution of the quantized neural network mode that applies uint8 input values to the uint8 weights in the neural network layers 106 ("OP uint8" in FIG. 1B). But since the original neural network was trained on a 32 bit-width computing device including float32 weight values, the result of the inferences reflect the 32-bit fidelity in the model, so the results undergo re-quantization 108 to provide 8-bit unsigned value (uint8) output values.

FIG. 1B illustrates that there are five types of loss in the fixed-point quantized pipeline, e.g., input quantization loss, weight quantization loss, runtime saturation loss, activation re-quantization loss, and possible clipping loss for certain non-linear operations. For these and other reasons, the quantization of large bit-width values into small bit-width representations may introduce quantization noise on the weights and activations. That is, there may be a significant numerical difference between the parameters in a large bit-width model (e.g., float32, int32, etc.) and their small bit-width representations (e.g., uint8 output value, etc.). This difference may have a significant negative impact on the efficiency, performance or functioning of the neural network on a small bit-width computing device.

The exact effect of the errors or noise that is introduced through quantization of large bit-width models into small bit-width representations is hard to predict, but it often leads to reduced model performance and accuracy. For example, a FP32 model may be 90 percent accurate, whereas its INT8 variant generated using conventional quantization techniques may be only 50 percent accurate. This difference may have a significant negative impact on the efficiency, performance or functioning of the neural network executing on the computing device.

A conventional method of quantization applied to trained neural network models includes mapping the weights and activations of the model to small bit-width representations through quantization of the original large bit-width values onto an equally spaced grid. In such a conventional method, the grid may be determined via asymmetric min-max scaling (or any other per-tensor quantization scheme, such as symmetric, asymmetric, qscheme, etc.), which may include dividing the range between the minimum and maximum values of a weight or activation tensor (multidimensional array) into equally spaced intervals. However, there are a number of challenges associated with systems that use asymmetric min-max scaling in post-training quantization. For example, when the weight ranges of different layers or channels differ significantly, it is challenging to accomplish per-tensor quantization of neural network weight tensors (e.g. for convolutional layers, etc.) without negatively impacting the performance and functioning of the neural network. This is because asymmetric min-max quantization sacrifices representational precision of small values in order to represent the largest values of the neural network weight tensors. When the weight ranges differ significantly per layer/channel, there are often large quantization errors for channel weights with small ranges. Such large quantization errors could have a significant negative impact on the performance and functioning of the neural network.

For these and other reasons, many systems perform quantization operations during the training of the models, which may require complex processing or detailed knowledge of the models used during training.

Various embodiments include methods, and computing devices configured to implement the methods, of performing post-training quantization of weights and activations of a trained neural network model without asymmetric min-max quantization. A computing device may be configured to map large bit-width (e.g., FP32, etc.) weights and activations to small bit-width (e.g., INT8) representations without sacrificing representational precision, generating large quantization errors, or otherwise having a significant negative impact on the performance of the neural network or the client computing device on which it is installed. Various embodiment methods may be implemented for any grid (e.g., symmetric grid, asymmetric grid, evenly spaced grid, unevenly spaced grid, etc.) having ranges that are dependent on the minimum and maximum values found in the data of that range (for activations) or in the weight array (for weight quantization).

Various embodiments may utilize observed properties of linear activation functions with or without a bias offset, piecewise linear functions, and certain non-linear functions. For example, it has been observed that the following equality holds for all non-negative scaling factors s and a linear activation function $f( )$ without a bias offset (formulations for the more general case including biases are addressed below):

$$sf(x)=f(sx)$$

where x is a vector of input values to a layer of the neural network.

This equality also holds for piecewise linear functions where the only nonlinearity occurs at 0, such as a Rectified Linear Unit (ReLU) function or a Parametric Rectified Linear Unit (PReLU) function, which are commonly used activation functions. For general piecewise linear functions, the equality holds if the linear and bias offsets are scaled appropriately for the corresponding scaling factor in the right-hand side of the equality. For certain non-linear functions (e.g., the squaring function, etc.) this equality holds with some modification of the scaling parameter. Various embodiments utilize these characteristics to convert large bit-width (e.g., FP32, etc.) weights and activations into small bit-width (e.g., INT8) representations.

Various embodiments may include cross-layer rescaling to reduce quantization errors due to layer weights that vary widely or include outliers. Various embodiments may include equalizing the ranges of weight tensors or channel weights within a layer of a neural network by scaling each of the output channels weights by a corresponding scaling factor, and scaling the next layer's corresponding input channel weights by the inverse of the corresponding scaling factor. A number of different factors or techniques may be used to determine the corresponding scaling factor, including heuristics, equalization of dynamic ranges, equalization of range extrema (minima or maxima), differential learning using straight through estimator (STE) methods and a local or global loss, and/or by using a metric for the quantization error and a black box optimizer that minimizes the error metric with respect to the scaling parameters. A black box optimizer may be a component that implements any of a variety of "black box" optimization techniques known in the art, such as a derivative-free algorithm that requires the availability of objective function values but no derivative information.

Various embodiments include a number of features and enhancements to quantization methods that improve the performance of a neural network and the devices that implement all or portions of the neural network. For example, under mild conditions on the activation functions, rescaling operations may be applied between layers in a neural network without changing the final layer's output. In addition, the equalization of ranges per channel improves the quantization performance, and the use of the black box optimizer on a quantization error metric allows the system to efficiently determine a suitable rescaling parameter that provides an acceptable level of data loss.

Various embodiments may optimize groups of layers that are connected through batch normalization and non-linear operations, without any splitting operations such as concatenations, residual connections, outputs that get used by two layers, etc., and optimize over the continuous blocks, such as within a residual network (resnet) block.

For all the reasons discussed above, a computing device configured to perform cross layer rescaling operations in accordance with various embodiments may enhance or improve the performance, accuracy, and precision of the quantized models, and in turn, reduce the computational complexity associated with neural networks. For example, by quantizing models to a desired bit-width and then recovering much of the accuracy lost due to quantization, a computing device configured to perform cross layer rescaling operations in accordance with various embodiments may balance trade-offs between computational complexity and accuracy. In addition, due to mathematical equivalence, full precision (e.g., FP32, etc.) performance may remain constant or unaltered by the cross layer rescaling operations. Due to rescaling, the cross layer rescaling operations may recover performance drops that result from quantization (e.g., for all representations, including INT8).

Further, the cross layer rescaling operations allow the computing device to forgo expensive fine tuning or quantization-aware training operations, which makes the neural network easy to deploy to client devices, in a software development kit (SDK), a cloud system or network, and/or in any system in which the owner/user of the model and the owner/user of the inference hardware are different.

Figure 2:
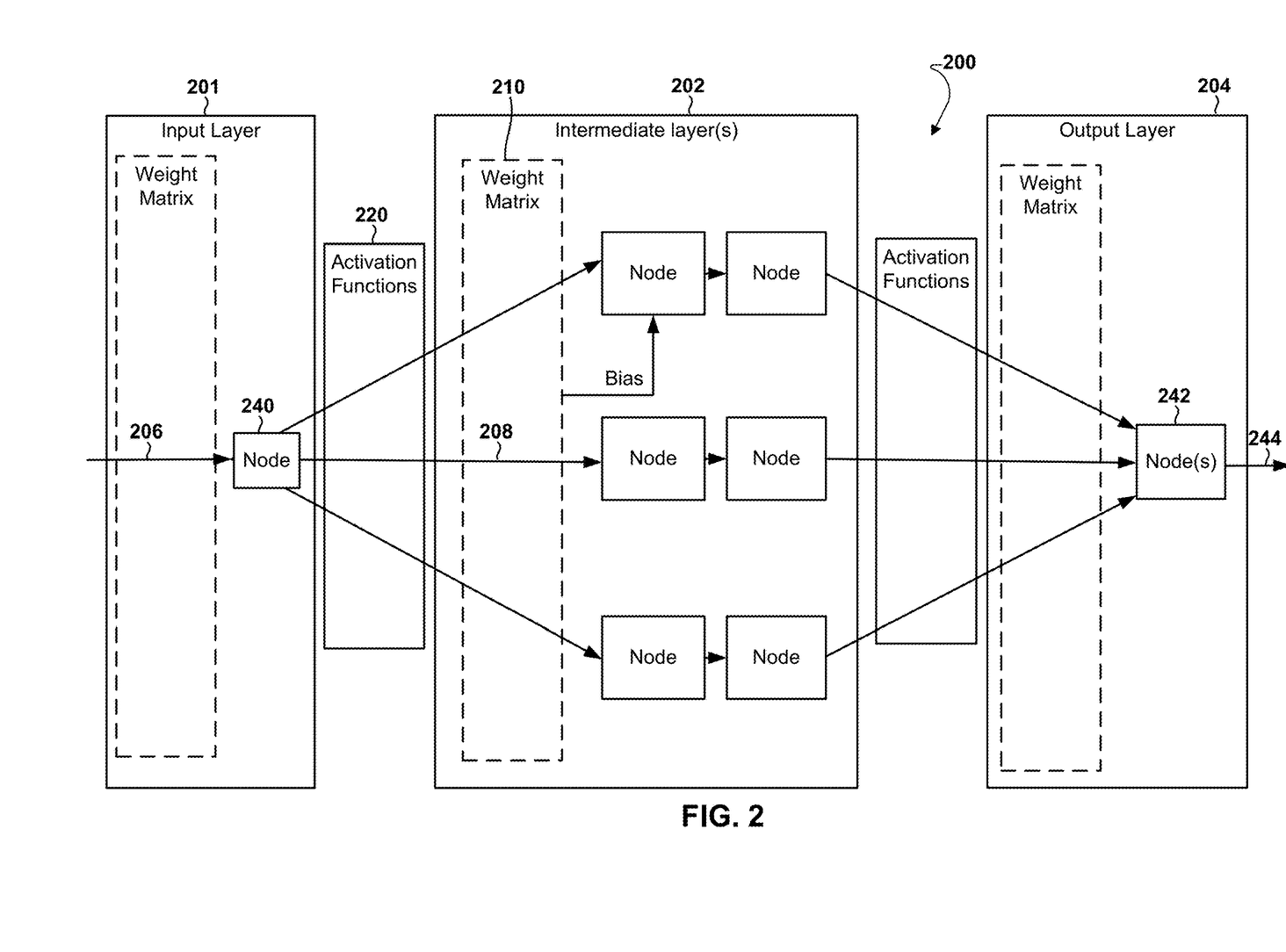
FIG. 2 is a component block diagram illustrating interactions between components in an example neural network suitable for use with various embodiments.

FIG. 2 illustrates interactions between components in an example neural network 200 suitable for use with various embodiments. The multilayer neural network may include an input layer 201, one or more intermediate layer(s) 202, and an output layer 204. Each of the layers may include one or nodes 240 that perform operations on the data. In between the layers, there may be various activation functions 220, such as Rectified Linear Unit (ReLU) function that cuts off activations below zero.

The input layer 201 may receive and process an input signal 206, generate an activation 208, and pass it to the intermediate layer(s) 202 as black box inputs. The intermediate layer(s) inputs may multiply the incoming activation with a weight matrix 210 or may apply one or more weight factors and/or a bias to the black box inputs.

The nodes in the intermediate layer(s) 202 may execute various functions on the inputs augmented with the weight factors and the bias. Intermediate signals may be passed to other nodes or layers within the intermediate layer(s) 202 to produce the intermediate layer(s) activations that are ultimately passed as inputs to the output layer 204. The output layer 204 may include a weighting matrix that further augments each of the received signals with one or more weight factors and bias. The output layer 204 may include a node 242 that operates on the inputs augmented with the weight factors to produce an estimated value 244 as output or neural network inference.

Various embodiments provide efficient algorithms that may be implemented in circuitry, in software, and in combinations of circuitry and software for performing cross layer rescaling operations for improved quantization without requiring a complete understanding or rigorous mathematical models. The embodiment algorithms are premised upon a general mathematical model of the linear and nonlinear interferences, details of which described below. These equations are not necessarily directly solvable, and provide a model for structuring that perform cross layer rescaling operations for improved quantization performance according to various embodiments.

For ease of reference, the following notation is used in the following descriptions of various embodiments: W represents the weights of a layer of a neural network before quantization; x represents an input to a layer of the original trained neural network model (i.e., large bit-width model); y represents an output or activation of a layer of a full-width neural network (thus y=W*x); $\tilde{W}$ represents the weights of a given layer of a quantized neural network (i.e., after quantization of W); $\tilde{x}$ represents an input to a layer of a quantized neural network; $\tilde{y}$ represents the output or activation of a layer of a quantized neural network (thus $\tilde{y}=\tilde{W}*x$); $\epsilon$ represents the error introduced through quantization of the weights; and $\mathbb{E}[\,]$ represents the expected value of the quantity within the brackets. As neural networks include multiple layers, references to y, x, W and $\tilde{W}$ are also included herein with an index i to indicate that the values are for the i'th layer of the neural network.

Figure 3:
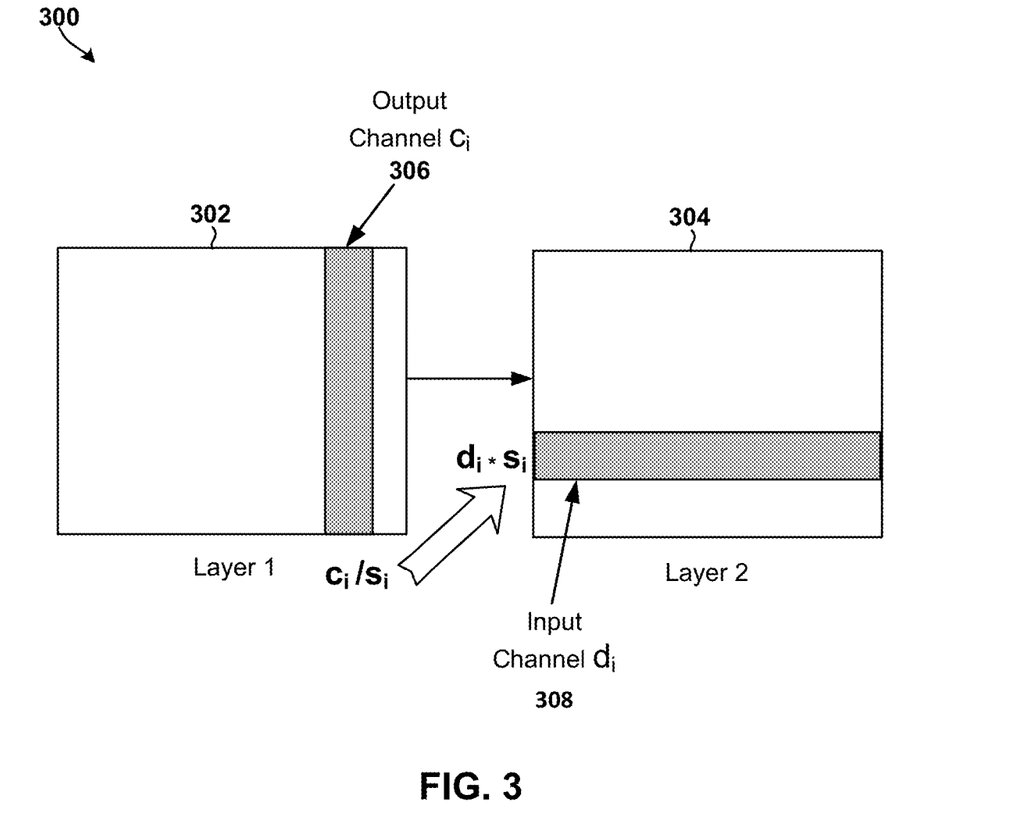
FIG. 3 is a component block diagram illustrating a computing device to perform cross layer rescaling operations for improved quantization performance in accordance with the various embodiments.

FIG. 3 illustrates cross layer rescaling operations that may be performed in a computing system 300 that includes a first layer 302 having an output channel $c_i$ 306 with a large range and a second layer 304 having an input channel $d_i$ 308 with a different range.

To reduce outliers and nearly equalize the ranges of weight tensors or channel weights within a layer, the computing system 300 may move scaling of the first layer to the adjacent second layer. For example, the scaling S of the output channel $c_i$ of the first layer 302 may be moved to the second layer 304 without loss of accuracy when the layers have a linear activation function without bias. The relationship between layers 0 and 1 may be described as follows in which $W_1$ and $W_1$ are a weight tensors of layers 1 and 2; $x_0$ and $x_1$ are vectors of input data to layers 0 and 1, and S is a diagonal matrix with the non-negative scaling factors s, on its diagonal, and $S^{-1}$ is the inverse of matrix S:

$x_1 = f(W_1 x_0); x_2 = f(W_2 x_1);$ and $x_2 = f(W_2 \cdot f(W_1 x_0)) = f(W_2 \cdot f(S \cdot S^{-1} W_1 x_0)) = f(W_2 S \cdot f(S^{-1} W_1 x_0))$ if $f(\cdot)$ is a linear function. This relationship also holds for convolutional layers in a neural network.

If scaling factor $s_i$ scales $c_i$ in the first layer 302, the computing device may instead factor it out and multiply the input channel $d_i$ in second layer 304, moving the scaling factors for each layer to equalize the ranges of the channels of both $W_1$ and $W_2$.

In applications in which $f$ is piecewise linear or has a bias, $f$ may be scaled according to: $\tilde{f}(\cdot) = f/s(\cdot)$ in which the ~ symbol indicates a scaled function.

That is, while it is known that scaling across a linear function is preserved such that $f(sx) = sf(x)$ where s is a positive scale factor, many activation functions are not precisely linear but rather are piecewise linear, or more precisely piecewise affine, since the y-intercepts are not zero. For piecewise affine functions, a similar result can be derived, although the function parameters change. Given the following definition of a piecewise affine function:

$$f(x) = \begin{cases} a_1 x + b_1, & -\infty < x < c_1 \\ a_2 x + b_2, & c_1 < x < c_2 \\ \vdots & \vdots \\ a_n x + b_n, & c_{n-1} < x < \infty \end{cases}$$

The result of applying a scaling of s to the input x can be expressed as follows:

$$f(sx) = \begin{cases} a_1 sx + b_1, & -\infty < sx < c_1 \\ a_2 sx + b_2, & c_1 < sx < c_2 \\ \vdots & \vdots \\ a_n sx + b_n, & c_{n-1} < sx < \infty \end{cases}$$

$$f(sx) = s \begin{cases} a_1 x + b_1/s, & -\infty < x < c_1/s \\ a_2 x + b_2/s, & C_1/s < x < c_2/s \\ \vdots & \vdots \\ a_n x + b_n/s, & c_{n-1}/s < x < \infty \end{cases}$$

where $a_i$, $b_i$ and $c_i$ are function parameters. Thus, $f(sx) = s\tilde{f}(x)$ where $\tilde{f}$ denotes the modified function with different, but deterministic parameters:

$\tilde{a}_i = a_i$ $\tilde{b}_i = b_i/s$ $\tilde{c}_i = c_i/s$

This simplifies for some important activations listed in the table below.

| Function | n | Parameters | Resulting function |
|---|---|---|---|
| ReLU | 2 | $a_1 = 0, a_2 = 1$<br>$b_1 = b_2 = 0$<br>$c_1 = 0$ | $f(sx) = s \begin{cases} 0, & x < 0 \\ x, & x > 0 \end{cases}$ |
| PreLU | 2 | $a_1 = \varepsilon, a_2 = 1$<br>$b_1 = b_2 = 0$<br>$c_1 = 0$ | $f(sx) = s \begin{cases} \varepsilon x, & x < 0 \\ x, & x > 0 \end{cases}$ |
| ReLU6 | 3 | $a_1 = 0, a_2 = 1, a_3 = 0$<br>$b_1 = b_2 = 0, b_3 = 6$<br>$c_1 = 0, c_2 = 6$ | $f(sx) = s \begin{cases} 0, & x < 0 \\ x, & 0 < x < 6/s \\ 6/s, & x > 6/s \end{cases}$ |

An inverse scaling may be applied to the second layer 304 corresponding input channel $d_i$ weights. Again, the rescaling parameters may be determined via heuristics, equalization of dynamic ranges, equalization of range extrema (minima or maxima), differential learning using STE methods and a local or global loss, and/or by using a metric for the quantization error and a black box optimizer that minimizes the error metric with respect to the scaling parameters.

Further embodiments may use batch normalization to further reduce errors from quantizing a (e.g., a 32-bit model) neural network into a quantized (e.g., an INT8 model) neural network. Batch normalization may improve inference times in addition to reducing quantization errors. Folding the batch normalization parameters into a preceding layer improves inference time because per channel scale and shift operations do not have to be performed—those operations are subsumed into the weight and bias parameters. The quantization error is reduced because when the batch normalization parameters are folded into the preceding layer's weights, the batch normalization parameters and preceding activations do not require quantization. In addition, folding the Rectified Linear Unit (ReLU) or Rectified Linear 6 (ReLU6) activations into a layer ensures that activation quantization happens after ReLU6, which provides an extra bit of precision for quantization activations.

Applying batch normalization to a linear layer may be restructured as:

$$y = \frac{\gamma}{\sigma} \odot (Wx - \mu) + \beta$$

where $\mu$ and $\sigma$ are (running) batch mean and variance statistics obtained during training, $\beta$ and $\gamma$ are parameters learned during training, and $\odot$ denotes the elementwise (Hadamard) product. Batch normalization may be performed per output unit, so $\gamma$, $\beta$, $\mu$ and $\sigma$ have one element per output unit y. This can be rewritten as:

$$y = \hat{W}x + b$$

$$\text{where } \hat{W} = W \text{diag}\left(\frac{\gamma}{\sigma}\right), b = \beta - \mu \odot \left(\frac{\gamma}{\sigma}\right),$$

diag (.) turns an dimensional vector into an N×N dimensional diagonal matrix, and all divisions are applied elementwise. In some embodiments, W may be computed at compile time when executable code for a quantized neural network is generated from a neural network with a large bit-width neural network (e.g., a FP32 model). As explained in more detail herein with reference to FIG. 5, the operations involved in such batch normalization may involve a compiler and/or SDK executing on a computing device performing batch normalization folding on the large bit-width neural network, followed by cross-layer equalization, and quantizing the neural network layer weights to the desired small bit-width (e.g., 8-bit) neural network for execution on a small bit-width architecture computing device.

In convolutional channels, batch normalization may be applied per output channel C. The folding described above may be applied to each output channel dimension. For example, for a convolutional weight tensor W of shape $C_{out} \times C_{in} \times K \times K$, batch normalization folding may be applied by adapting $W_{C,:,:,:}$ as follows:

$$W_{C,:,:,:} = (\gamma_C W_{C,:,:,:})/\sigma_C$$

where the subscript C indicates the associated output channel C.

The bias may be applied to each output channel and updated in the same way as for a linear layer.

In some embodiments, the computing device may perform cross layer rescaling operations that include determining whether consecutive layers in the neural network have a linear or piecewise-linear relationship. In response to determining that consecutive layers in the neural network have a linear or piecewise-linear relationship, the computing device may shift scaling factors from one layer to another to improve quantization performance. The linear relationship between layers may be described generally including bias terms as follows:

$$x_1 = f(W_1 x_0 + b_1)$$
$$x_2 = f(W_2 x_1 + b_2)$$
$$= f(W_2 \cdot f(W_1 x_0 + b_1) + b_2)$$
$$= f(W_2 S \cdot f(S^{-1}(W_1 x_0 + b_1)))$$
$$= f(W_2 S \cdot f(S^{-1} W_1 x_0 + S^{-1} b_1) + b_2)$$

where S is a diagonal matrix in which the element $S_{ii}$ is a nonnegative scaling factor for channel i. These equalities may hold if the activation function $f(\cdot)$ is ReLU or PReLU, but not if $f(\cdot)$ is a non-linear function such as a sigmoid activation or tanh function.

Folding the scaling parameters into the weight matrices and the biases, i.e. $\tilde{W}_1 = S^{-1} W_1$, $\tilde{W}_2 = W_2 S$ and $\tilde{b}_1 = S^{-1} b_1$, yields:

$$x_2 = f(W_2 S \cdot f(S^{-1} W_1 x_0 + S^{-1} b_1) + b_2)$$
$$= f(\tilde{W}_2 \cdot f(\tilde{W}_1 x_0 + \tilde{b}_1) + b_2)$$

Thus, by applying rescaling and folding the scaling parameters into the weight matrices and biases, the final output $x_2$ does not change, even though the values in W did change in $\tilde{W}$.

In order to determine the rescaling parameters and further improve the performance of the post training quantization operations, the computing device may be configured to select S in a way that it makes the dynamic ranges of each channel as similar as possible. For example, following heuristic is a good proxy in finding suitable rescaling parameters and does not require an expensive optimization procedure.

$$range_1 = \max(abs(W_1), 0)$$
$$range_2 = \max(abs(W_2), 1)$$
$$S = \frac{range_1}{sqrt(range_1 \cdot range_2)}$$

where $\max(\cdot, 0)$ is the maximum of the matrix along the output axis and $\max(\cdot, 1)$ is the maximum of the matrix along the input axis. This heuristic ensures that the maximum/minimum per channel, which also defines the quantization range, are equally spread across the layers that share the same channel. Since the quantization error between layers have a multiplicative relationship, this results in lower quantization error.

If more than two layers share the same channels; such as in case of channel-wise operations such as separable convolutions, the extension may be:

$$S^{12} = \frac{range_1}{\sqrt[3]{range_1 \cdot range_2 \cdot range_3}}$$

$$S^{23} = \frac{\sqrt[3]{range_1 \cdot range_2 \cdot range_3}}{range_2}$$

where $range_n$ is the range of layer n along the shared axis.

In a specific neural network architecture example that includes a sequence of layers that do not share common channels (e.g., in a normal feed forward network in the Visual Geometry Group (VGG) neural network architecture, etc.), the computing device may be configured to apply the above operations in a sequential way, that is first finding the scaling parameter between $W_1$ and $W_2$, then between $W_2$ and $W_3$, and so on.

In order to avoid a big dynamic range in the activations, the computing device may be configured to absorb large biases in the subsequent layer. If there is no activation function, the device may absorb the bias without loss in performance in the following layers bias term (or in case of batch normalization in the mean).

$$x_i = W_i x_{i-1} + b_i$$
$$= W_i (W_{i-1} x_{i-2} + b_{i-1}) + b_i$$
$$= W_i W_{i-1} x_{i-2} + W_i b_{i-1} + b_i$$
$$= W_i \hat{x}_{i-1} + \hat{b}_i$$

where $\hat{b}_i = W_i b_{i-1}$ and $\hat{x}_{i-1} = W_{i-1} x_{i-2}$.

Under some mild conditions this also holds for ReLU activation functions, namely when the full activation range falls into the linear part. In the case of ReLU, the computing device may use this to absorb some part of the bias, namely all that is greater than $3\sigma$ where $\sigma$ is the standard deviation of the activations (which the computing device may determine from the batch normalization operations, namely its $\gamma$ parameter). Under the assumption that the activations are distributed according to a normal distribution, this means that no more than 0.135% of the activations are altered by absorbing large biases in the subsequent layer. In practice this helps for activation quantization but does little harm to the full precision performance.

For applying cross-layer equalization, any ReLU6 may be replaced with ReLU to make the implementation easier. This does not hurt performance for a range of networks. It is possible to make the operations work for ReLU6 if necessary, but the end result may be a ReLUK function where the threshold K will be different for each channel.

Figure 4A:
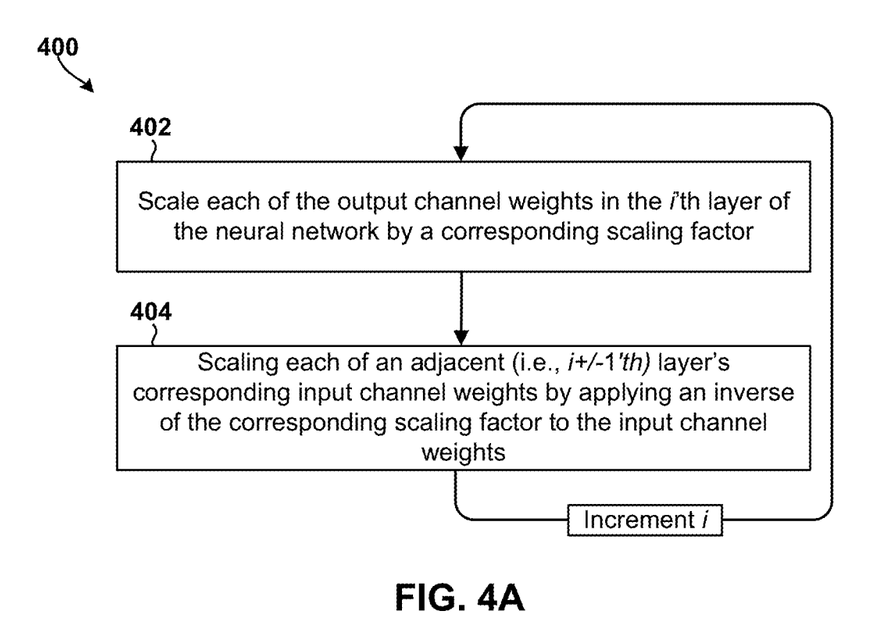
FIGS. 4A, 4B, and 5 are process flow diagrams illustrating methods of performing cross layer rescaling operations in accordance with various embodiments.

FIG. 4A illustrates a neural network quantization method 400 for performing cross layer rescaling to improve quantization in accordance with an embodiment. In the method 400, the ranges of weight tensors and channel weights within an i'th layer of a neural network may be scaled from the i'th layer to the adjacent (i.e., i+/−1) layer. The method 400 may be particularly suitable for neural networks in which the layers exhibit a linear (or near linear) activation function without bias. The method 400 may be performed by a processor that includes a neural network (e.g., 200) in a computing device.

In block 402, the processor may scale each of the output channel weights in the i'th layer by a corresponding scaling factor. Said another way, in block 402, the processor may change or adjust the weights within the i'th layer of the neural network by scaling (e.g., dividing or multiplying) the output channel weights by a corresponding scaling factor determined so as to equalize the ranges within the weight tensor the i'th layer.

In block 404, the processor may scale each of the adjacent layer's corresponding input channel weights (i.e., the input channel weights of the i+1 layer) by applying an inverse of the corresponding scaling factor to each of input channel weights. Said another way, in block 404, the processor may change or adjust the weights within the next (i.e., i+1) layer of the neural network by an inverse of the corresponding scaling factor applied in the previous layer (i.e., applied to the i'th layer in block 402).

The operations in the method 400 may be repeated layer by layer for all layers within the neural network (i.e., incrementing the index i with each repetition), performing cross-layer rescaling where necessary to equalize or normalize weights in any layers where necessary to remove outliers and reduce quantization errors. The result of performing the operations in the method 400 may be a neural network that is suitable for implementation on a computing device configured with smaller bit-width capacity that was used to trained the neural network.

Figure 4B:
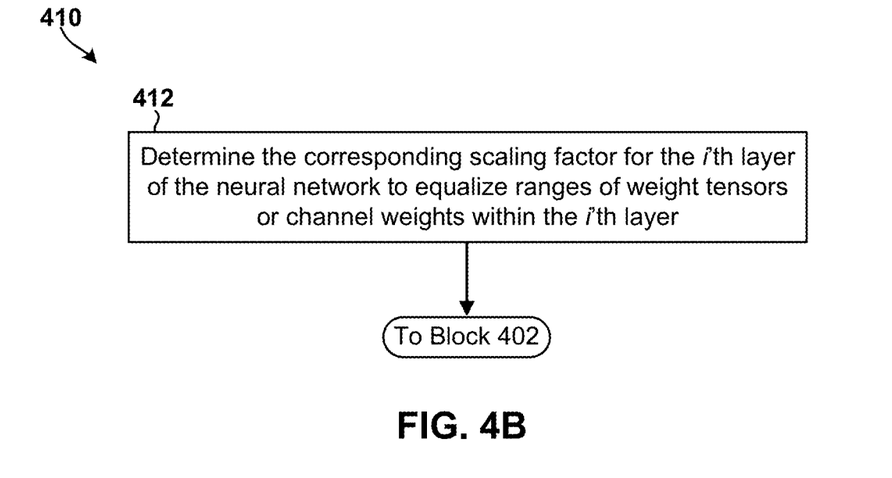

FIG. 4B illustrates an additional operation neural network quantization method 410 that may be performed in some embodiments as part of performing cross layer rescaling in method 400 to improve quantization in accordance with some embodiments. In the method 400, the corresponding scaling factors are determined so that ranges of weight tensors and channel weights within the i'th layer of the neural network may be equalized and outliers removed by scaling from the i'th layer to the adjacent (i.e., i+1) layer. The method 410 may be performed as part of the method 400 by a processor that includes a neural network (e.g., 200) in a computing device.

In block 412, the processor may determine the corresponding scaling factor used for scaling the i'th layer channel weights in block 402 so as to equalize the ranges within the weight tensor the i'th layer. In some embodiments, the corresponding scaling factor may be determined based on heuristics, equalization of dynamic ranges, equalization of range extrema (minima or maxima), differential learning using STE methods and a local or global loss, or by using a metric for the quantization error and a black box optimizer that minimizes the error metric due to quantization.

The processor may then proceed with the method 400 in block 402 as described.

Figure 5:
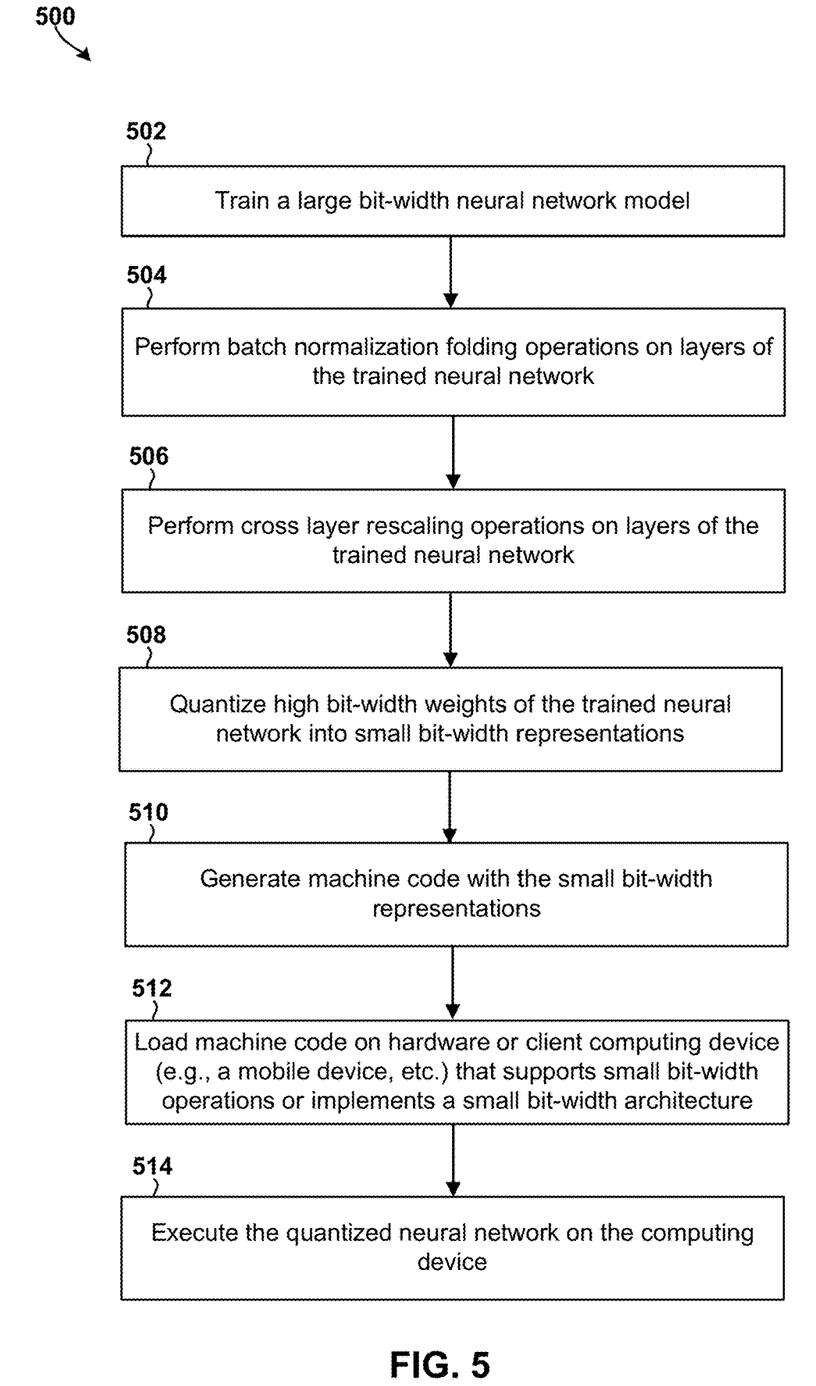

FIG. 5 illustrates a method 500 for training a neural network on a large bit-width computing device and using cross layer rescaling and quantization to transform the neural network into a form suitable for execution on a small bit-width computing device. The method 500 may be performed by a processor that includes a neural network (e.g., 200) in a computing device.

In block 502, a large bit-width computing device (e.g., a server or work station computer) may train a large bit-width neural network model using a training data set. Such training may involve any of a variety of neural networks and any of a variety of training data to yield a trained neural network that can perform a wide variety of functions. As a non-limiting example, the neural network may include Rectified Linear Unit (ReLU) or Rectified Linear 6 (ReLU6) activations.

In block 504, a processor may perform batch normalization folding operations on the weights and activations of layers within the trained machine learning model. This may include folding batch normalization parameters of one layer into a preceding layer (e.g., a preceding convolutional layer), with the process repeated for all layers. Thus, a preceding weight layer is fused with the parameters of the batch normalized layer. As a result, the computing device only needs to perform the linear/convolutional operations and not any more of the batch normalization operations for inference.

In block 506, the processor may perform cross layer rescaling operations on the layers of the neural network. The operations performed in block 506 may include determining whether consecutive layers in the neural network have a linear or piecewise-linear relationship. In response to determining that consecutive layers in the neural network have a linear or piecewise-linear relationship, the computing device may shift scaling factors from one layer to another to improve quantization performance. In order to determine the rescaling parameters and further improve the performance of the post training quantization operations, the processor may select a scaling matrix S in a way that it makes the dynamic ranges of each channel as similar as possible. In some implementations, scaling parameters may be determined sequentially between adjacent layers in the neural network.

In block 508, the processor may quantize the weights or weight tensors form a large bit-width (e.g., FP32, etc.) form into small bit-width (e.g., INT8) representations to yield a neural network suitable for implementation on a small-bit width processor. The processor may use any of a variety of know methods of quantizing neural network weights to generate a quantized version of the neural network in block 508.

In block 510, the processor may generate machine code for implementing the quantized neural network with the small bit-width representations into an executable form for use on a computing device (e.g., a mobile device).

In block 512, the processor may load the machine code generated in block 510 onto hardware or memory of a computing device (e.g., a mobile device, etc.) having a processor that supports small bit-width operations or implements a small bit-width architecture.

In block 514, the computing device may execute the quantized neural network.

Figure 6:
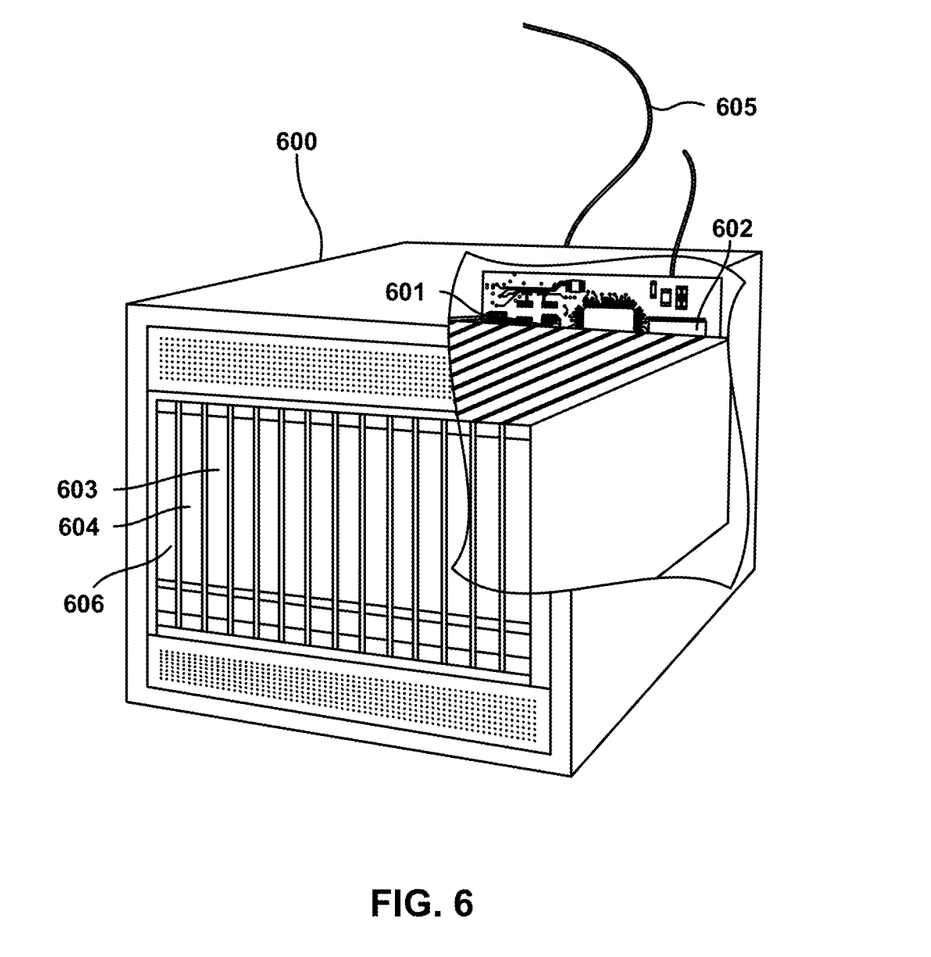
FIG. 6 is a component block diagram of server suitable for use with the various embodiments.

Various embodiments may be implemented on any of a variety of commercially available computing devices, such as the server 600 illustrated in FIG. 6. Such a server 600 typically includes a processor 601 that includes a neural network (e.g., 200) coupled to volatile memory 602 and a large capacity nonvolatile memory, such as a disk drive 603. The server 600 may also include a floppy disc drive, compact disc (CD) or DVD disc drive 604 coupled to the processor 601. The server 600 may also include network access ports 606 coupled to the processor 601 for establishing data connections with a network 605, such as a local area network coupled to other operator network computers and servers.

The processors may be any programmable microprocessor, microcomputer or multiple processor chip or chips that can be configured by software instructions (applications) to perform a variety of functions, including the functions of the various embodiments described in this application. In some wireless devices, multiple processors may be provided, such as one processor dedicated to wireless communication functions and one processor dedicated to running other applications. Typically, software applications may be stored in the internal memory 603 before they are accessed and loaded into the processor. The processor may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments may be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of quantizing a neural network, comprising:
    loading a first bit-width neural network model of the neural network on a first processor of a mobile device implementing a first bit-width architecture;
    performing cross-layer range equalization across at least a first layer and second adjacent layers in the first bit-width neural network model by:
        scaling each output channel weight of the first layer of the first bit-width neural network model by a corresponding scaling factor in the first bit-width neural network model and generating a first layer of a first bit-width scaled neural network model; and scaling each of the second adjacent layers' corresponding input channel weights by applying an inverse of the corresponding scaling factor to the input channel weights in the first bit-width neural network model and generating each of a plurality of second adjacent layers of the first bit-width scaled neural network model;

quantizing the output channel weights and corresponding input channel weights from the first bit-width scaled neural network model to a second bit-width architecture and generating a second bit-width neural network model;

loading the second bit-width neural network model on a second processor of the mobile device implementing the second bit-width architecture, wherein:
the second bit-width architecture includes a smaller bit-width than the first bit-width architecture; and
executing the second bit-width neural network model on the second processor of the mobile device generates an inference result used to control a function of the mobile device associated with the second processor.

2. The method of claim 1, further comprising determining the corresponding scaling factor so as to equalize ranges of weight tensors or output channel weights within a first layer of the neural network.

3. The method of claim 1, further comprising determining the corresponding scaling factor based on at least one of:
heuristics;
equalization of dynamic ranges;
equalization of range extrema (minima or maxima);
differential learning using straight through estimator (STE) methods and a local or global loss; or
using an error metric for quantization error and a black-box optimizer that minimizes the error metric with respect to the scaling.

4. The method of claim 1, further comprising using a black-box optimizer on a quantization error metric to find the corresponding scaling factor.

5. The method of claim 1, further comprising performing batch normalization folding operations on the first bit-width scaled neural network model.

6. A method of quantizing a neural network, comprising:
loading a first bit-width neural network model on a first processor of a mobile device implementing a first bit-width architecture;
performing cross-layer range equalization across at least a first layer and second adjacent layers in the first bit-width neural network model by:
scaling each output channel weight of the first layer of the first bit-width neural network model by a corresponding scaling factor and generating a first layer of a first bit-width trained neural network model; and
scaling each of a second adjacent layers' corresponding input channel weights by applying an inverse of the corresponding scaling factor to the input channel weights in the first bit-width neural network model and generating each of a plurality of second adjacent layers of the first bit-width trained neural network model;
quantizing the output channel weights and corresponding input channel weights within the first bit-width trained neural network to generate a quantized second bit-width neural network model suitable for execution on a second bit-width architecture processor; and
loading the quantized second bit-width neural network model on a second processor of the mobile device implementing a second bit-width architecture,
wherein the second bit-width architecture includes a smaller bit-width architecture processor than the first bit-width architecture and executing the second bit-width neural network model on the second processor of the mobile device generates an inference result used to control a function of the mobile device associated with the second processor.

7. The method of claim 6, further comprising determining the corresponding scaling factor so as to equalize ranges of weight tensors or output channel weights within a first layer of the first bit-width neural network model.

8. The method of claim 6, further comprising determining the corresponding scaling factor based on at least one of:
heuristics;
equalization of dynamic ranges;
equalization of range extrema (minima or maxima);
differential learning using straight through estimator (STE) methods and a local or global loss; or
using an error metric for quantization error and a black-box optimizer that minimizes the error metric with respect to the scaling.

9. The method of claim 6, further comprising using a black-box optimizer on a quantization error metric to find the corresponding scaling factor.

10. The method of claim 6, further comprising performing batch normalization folding operations on the first bit-width trained neural network model.

11. A mobile device, comprising:
a first processor configured with processor-executable instructions to perform operations comprising:
loading a first bit-width neural network model on the first processor, wherein the first processor implements a first bit-width architecture;
performing cross-layer range equalization across at least a first layer and second adjacent layers in the first bit-width neural network model by:
scaling each output channel weight of the first layer of the first bit-width neural network model by a corresponding scaling factor in the first bit-width neural network model and generating a first layer of a first bit-width scaled neural network model; and
scaling each of the second adjacent layers' corresponding input channel weights by applying an inverse of the corresponding scaling factor in the first bit-width neural network model to the input channel weights and generating each of a plurality of second adjacent layers of the first bit-width scaled neural network model;
quantizing the output channel weights and corresponding input channel weights from the first bit-width scaled neural network model to a second bit-width architecture and generating a second bit-width neural network model; and
loading the second bit-width neural network model on a second processor of the mobile device implementing a second bit-width architecture, wherein the second bit-width architecture includes a smaller bit-width than the first bit-width architecture and executing the second bit-width neural network model on the second processor generates an inference result used to control a function of the mobile device associated with the second processor.

12. The mobile device of claim 11, wherein the first processor is configured with processor-executable instructions to perform operations further comprising determining the corresponding scaling factor so as to equalize ranges of weight tensors or output channel weights within a first layer of the neural network.

13. The mobile device of claim 11, wherein the first processor is configured with processor-executable instructions to perform operations further comprising determining the corresponding scaling factor based on at least one of:
   heuristics;
   equalization of dynamic ranges;
   equalization of range extrema (minima or maxima);
   differential learning using straight through estimator (STE) methods and a local or global loss; or
   using an error metric for quantization error and a black-box optimizer that minimizes the error metric with respect to the scaling.

14. The mobile device of claim 11, wherein the first processor is configured with processor-executable instructions to perform operations further comprising using a black-box optimizer on a quantization error metric to find the corresponding scaling factor.

15. The mobile device of claim 11, wherein the first processor is configured with processor-executable instructions to perform operations further comprising performing batch normalization folding operations in the first bit-width on the scaled-neural network model.

16. A computing device, comprising:
   a first processor configured with processor-executable instructions to perform operations comprising:
      loading a first bit-width neural network model on the first processor, wherein the processor implements a first bit-width architecture;
      performing cross-layer range equalization across at least a first layer and second adjacent layers in the first bit-width neural network model by:
         scaling each output channel weight of the first layer of the first bit-width neural network model by a corresponding scaling factor in the first bit-width neural network model and generating a first layer of the first bit-width scaled neural network model; and
         scaling each of the second adjacent layers' corresponding input channel weights by applying an inverse of the corresponding scaling factor in the first bit-width neural network model to the input channel weights generating each of a plurality of second adjacent layers of the first bit-width scaled neural network model;
      quantizing weights within the first bit-width scaled neural network to generate a quantized second bit-width neural network model suitable for execution on a second bit-width architecture processor; and
      loading the quantized second bit-width neural network model on a second processor implementing a second bit-width architecture, wherein the second bit-width architecture includes a smaller bit-width architecture processor than the first bit-width architecture and executing the quantized second bit-width neural network model on the second processor generates an inference result used to control a function of the computing device associated with the second processor.

17. The computing device of claim 16, wherein the first processor is configured with processor-executable instructions to perform operations further comprising determining the corresponding scaling factor so as to equalize ranges of weight tensors or output channel weights within a first layer of the first bit-width neural network model.

18. The computing device of claim 16, wherein the first processor is configured with processor-executable instructions to perform operations further comprising determining the corresponding scaling factor based on at least one of:
   heuristics;
   equalization of dynamic ranges;
   equalization of range extrema (minima or maxima);
   differential learning using straight through estimator (STE) methods and a local or global loss; or
   using an error metric for quantization error and a black-box optimizer that minimizes the error metric with respect to the scaling.

19. The computing device of claim 16, wherein the first processor is configured with processor-executable instructions to perform operations further comprising using a black-box optimizer on a quantization error metric to find the corresponding scaling factor.

20. The computing device of claim 16, wherein the first processor is configured with processor-executable instructions to perform operations further comprising performing batch normalization folding operations in the first bit-width on the first bit-width neural network model.

* * * * *